US011402537B2

(12) United States Patent
Han et al.

(10) Patent No.: US 11,402,537 B2
(45) Date of Patent: Aug. 2, 2022

(54) SYSTEMS AND METHODS FOR PULSED NEUTRON LOGGING IN A SUBTERRANEAN WELLBORE

(71) Applicant: BP Corporation North America Inc., Houston, TX (US)

(72) Inventors: Xiaogang Han, Katy, TX (US); Adrian Zett, Scotland (GB); Jeanine Galvan Amaya, Houston, TX (US); Brady Lanclos, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 30 days.

(21) Appl. No.: 16/668,953

(22) Filed: Oct. 30, 2019

(65) Prior Publication Data

US 2020/0150306 A1 May 14, 2020

Related U.S. Application Data

(60) Provisional application No. 62/822,276, filed on Mar. 22, 2019, provisional application No. 62/758,308, filed on Nov. 9, 2018.

(51) Int. Cl.
*E21B 47/00* (2012.01)
*G01V 5/10* (2006.01)
(Continued)

(52) U.S. Cl.
CPC ............. *G01V 5/102* (2013.01); *E21B 43/04* (2013.01); *E21B 47/00* (2013.01); *E21B 47/06* (2013.01); *E21B 47/07* (2020.05); *E21B 47/12* (2013.01)

(58) Field of Classification Search
CPC .......... G01V 5/10; G01V 5/102; G01V 5/101; E21B 47/005; E21B 43/04; E21B 47/00
See application file for complete search history.

(56) References Cited

U.S. PATENT DOCUMENTS 3,838,279 A * 9/1974 Schultz ................... G01V 5/102
250/269.6
4,524,272 A 6/1985 Paap et al.
(Continued)

FOREIGN PATENT DOCUMENTS

WO 20150167433 A1 11/2015

OTHER PUBLICATIONS

Partial PCT Search Report dated Feb. 14, 2020, for PCT/US2019/058850, filed on Oct. 30, 2019.
(Continued)

*Primary Examiner* — Kipp C Wallace
(74) *Attorney, Agent, or Firm* — Conley Rose, P.C.

(57) ABSTRACT

Methods and associated systems are disclosed for performing a logging operation within a subterranean wellbore extending within a subterranean reservoir. In an embodiment, the method includes (a) emitting neutrons into the subterranean wellbore or the subterranean reservoir, and (b) detecting gamma rays emitted from atoms disposed within the subterranean wellbore or the subterranean reservoir. In addition, the method includes (c) determining a first gamma ray count within a first energy window of the gamma rays detected at (b), and (d) determining a second gamma ray count within a second energy window of the gamma rays detected at (b). The second energy window is different than the first energy window. Further, the method includes (e) calculating a ratio of the first gamma ray count to the second gamma ray count.

7 Claims, 7 Drawing Sheets

(51) Int. Cl.
*E21B 43/04* (2006.01)
*E21B 47/07* (2012.01)
*E21B 47/06* (2012.01)
*E21B 47/12* (2012.01)

(56) References Cited

U.S. PATENT DOCUMENTS

| | | | |
|---|---|---|---|
| 4,950,892 A * | 8/1990 | Olesen | E21B 43/04 |
| | | | 250/269.7 |
| 5,481,105 A * | 1/1996 | Gold | E21B 43/04 |
| | | | 250/265 |
| 5,578,820 A * | 11/1996 | Gadeken | G01V 5/06 |
| | | | 250/256 |
| 6,119,777 A | 9/2000 | Runia | |
| 6,552,333 B1 | 4/2003 | Storm et al. | |
| 6,554,065 B2 | 4/2003 | Fisher et al. | |
| 6,815,665 B2 | 11/2004 | Storm et al. | |
| 7,059,404 B2 | 6/2006 | Flecker et al. | |
| 7,500,389 B2 | 3/2009 | Green et al. | |
| 7,634,942 B2 | 12/2009 | Green et al. | |
| 7,913,555 B2 | 3/2011 | Green et al. | |
| 8,549,906 B2 | 10/2013 | Green et al. | |
| 9,261,622 B2 * | 2/2016 | Inane | G01V 5/101 |
| 10,007,023 B2 | 6/2018 | Larimore et al. | |
| 10,215,880 B1 * | 2/2019 | Trcka | E21B 43/04 |
| 2004/0020646 A1 | 2/2004 | Flecker et al. | |
| 2009/0210161 A1 | 8/2009 | Duenckel et al. | |
| 2014/0144622 A1 * | 5/2014 | Dorffer | G01V 5/101 |
| | | | 166/250.1 |
| 2016/0003969 A1 * | 1/2016 | Zhou | G01V 5/102 |
| | | | 250/269.7 |
| 2018/0106927 A1 * | 4/2018 | Larimore | G01V 5/045 |
| 2018/0136361 A1 * | 5/2018 | Jacobson | G01V 5/102 |
| 2019/0033484 A1 * | 1/2019 | Stoller | G01B 15/02 |
| 2019/0153857 A1 | 5/2019 | Yi et al. | |
| 2019/0383130 A1 * | 12/2019 | Fox | G01V 1/40 |
| 2019/0383135 A1 | 12/2019 | Hill, III | |
| 2019/0383962 A1 * | 12/2019 | Zhou | G01V 5/104 |
| 2020/0326451 A1 * | 10/2020 | Schmid | G01V 5/101 |

OTHER PUBLICATIONS

Han et al., "New Applications of Multidetector Pulsed Neutron Technologies in Gravel Pack Completions," SPE-187189, Oct. 2017, pp. 1-11.

* cited by examiner

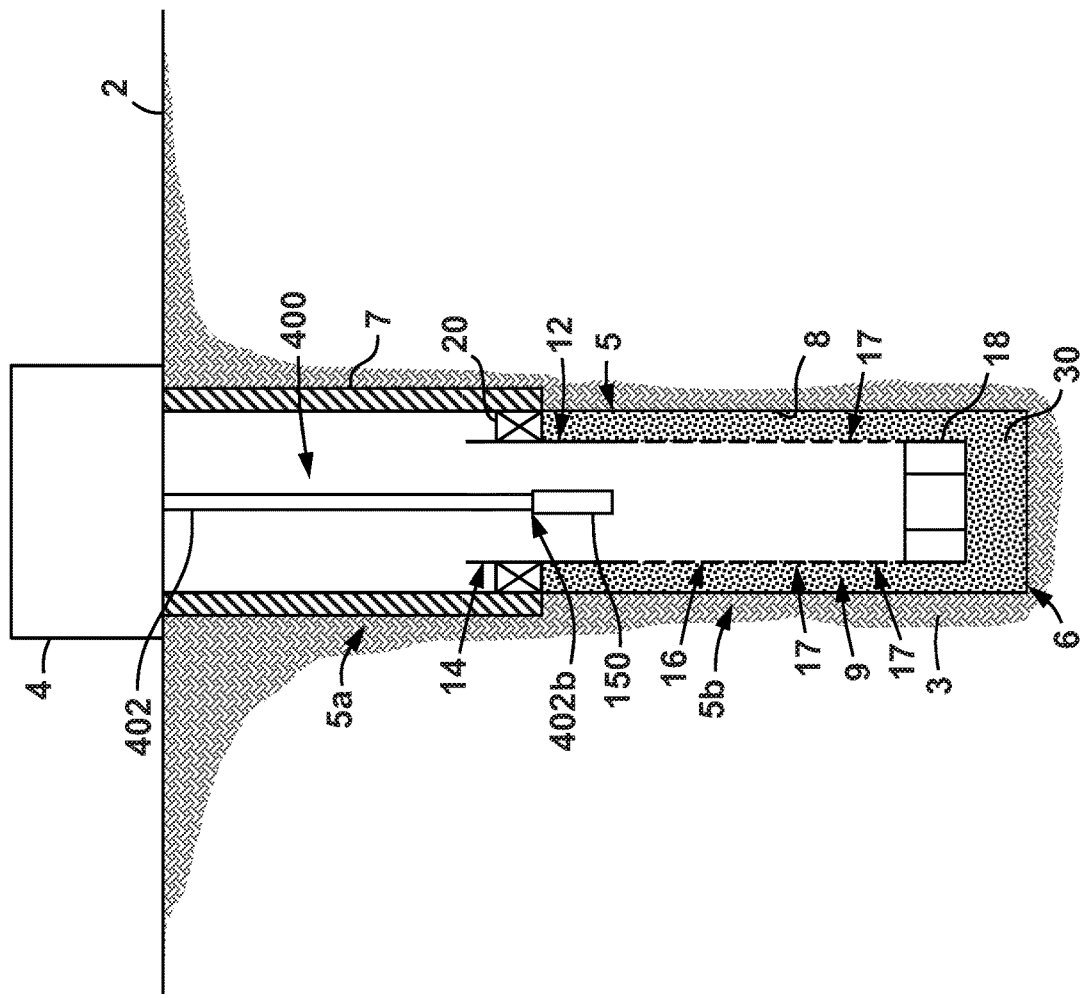

SYSTEMS AND METHODS FOR PULSED NEUTRON LOGGING IN A SUBTERRANEAN WELLBORE

CROSS-REFERENCE TO RELATED APPLICATIONS

This application claims the benefit of U.S. provisional patent application Ser. No. 62/758,308 filed Nov. 9, 2018, and entitled "Systems and Method for Pulsed Neutron Logging in a Subterranean Wellbore," and U.S. provisional patent application Ser. No. 62/822,276 filed Mar. 22, 2019, and entitled "Systems and Method for Pulsed Neutron Logging in a Subterranean Wellbore," both of which are hereby incorporated herein by reference in their entirety.

STATEMENT REGARDING FEDERALLY SPONSORED RESEARCH OR DEVELOPMENT

Not applicable.

BACKGROUND

This disclosure relates to systems and methods for performing logging in a subterranean formation. More particularly, this disclosure relates to systems and methods for performing pulsed neutron logging in a gravel packed wellbore extending within a subterranean formation.

To obtain hydrocarbons from subterranean formations, wellbores are drilled from the surface to access the hydrocarbon-bearing formation (which may also be referred to herein as a producing zone). After drilling a wellbore to the desired depth, a completion string containing various completion and production devices is installed in the wellbore to produce the hydrocarbons from the producing zone to the surface. In some instances, no casing or liner is installed within the section of the wellbore extending within the producing zone. To prevent the free migration of sands or other fines from the producing zone into the completion and production devices (that is, along with any produced hydrocarbons), a screen (or multiple screens) may be installed within the wellbore (either within an open wellbore or a perforated casing pipe). In addition, a properly sized proppant (e.g., sand) (as used herein, the proppant used within a gravel pack completion may be referred to generally as "gravel") is placed downhole through a tubular string, often called a wash pipe (which is disposed within the screen). During these operations, gravel is placed within the formation as well as the annulus disposed radially outside of the screen (e.g., an annulus extending radially from screen to either a casing pipe or the wellbore wall). Thereafter, the wash pipe may be pulled to the surface, leaving the screen and gravel in place. During subsequent production operations, the gravel forms a barrier to filter out the fines and sand from any produced fluids such that the fines and/or sand are prevented from entering the screens and being produced to the surface. This type of completion configuration is often referred to as a gravel pack completion. When a gravel pack completion is performed within an open wellbore (e.g., within a section of wellbore that has no casing or liner pipe disposed therein), such a completion may be referred to as an "open hole gravel pack completion." In addition, when a gravel pack completion is performed within a cased or lined wellbore (e.g., a section of a wellbore that has a casing or liner pipe disposed therein), such as completion may be referred to as a "cased hole gravel pack completion."

BRIEF DESCRIPTION OF THE DRAWINGS

For a detailed description of various exemplary embodiments, reference will now be made to the accompanying drawings in which:

FIG. 7 is a schematic view of a logging system for a subterranean wellbore according to some embodiments.

DETAILED DESCRIPTION

Figure 1:
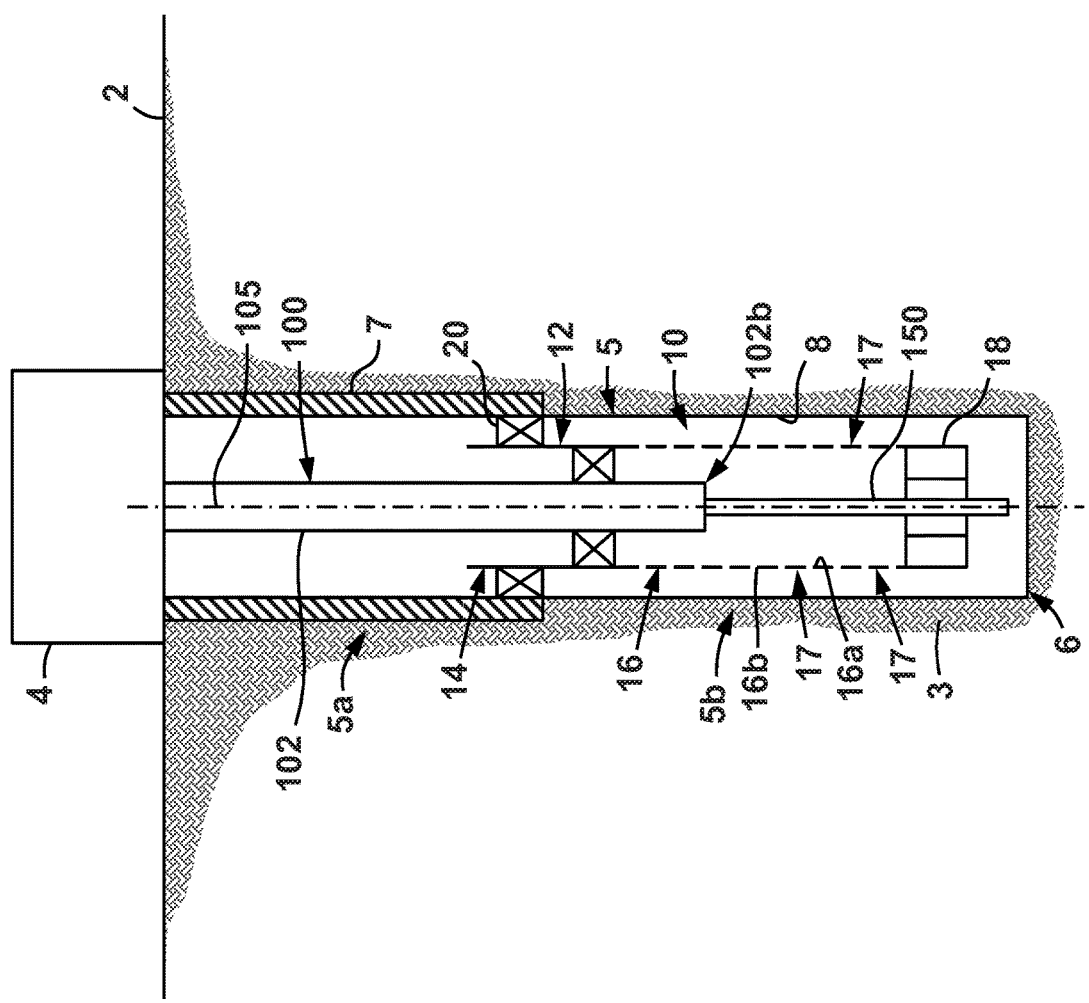
FIG. 1 is a schematic view of a completion and logging system for a subterranean wellbore according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. As used herein, the term "wellbore" generally refers to completed subterranean wellbores, semi-completed subterranean wellbores, and un-completed subterranean boreholes.

As previously described, gravel pack completions (including both open hole and cased hole gravel pack completions) include injecting a gravel (via slurry) into an annular space disposed about one or more screens (e.g., tubular screens) within a wellbore. The injected gravel then serves to filter out fines or sand (generally referred to herein as "fines") that may be produced from the subterranean formation along with other formation fluids (e.g., oil, gas, condensate, water, etc.), and therefore prevent the fines from being produced to the surface. Following a gravel pack completion operation, it is typically desirable to perform a wellbore logging operation to, among other things, inspect the quality of the gravel pack disposed therein. Specifically, in order for the gravel pack to serve as an effective filter for fines emitted from the formation, the annular volume (that is the volume of the annulus or section of annulus) should be generally filled with gravel (i.e., with minimal voids or unfilled spaces). Thus, a post completion logging operation may be intended to verify the quality of the gravel pack within the annulus (e.g., to determine that minimal or no voids or spaces exist within the gravel).

While many logging techniques and technologies exist, one wellbore logging method is pulsed neutron logging. Generally speaking, pulsed neutron logging involves the emission of neutrons into the wellbore and formation. Some of the emitted neutrons impact the nuclei of the atoms forming the wellbore, gravel pack, and formation and are absorbed thereby. In response, the impacted nuclei emit energy in the form of radiation, specifically gamma rays. The gamma rays are then detected by the logging device (e.g., in the time domain, energy domain, or both), such that they may be interpreted and processed to provide indications of the wellbore and/or formation contents. As will be described in more detail below, the detected gamma rays can also be utilized to determine the quality of a gravel pack following a gravel pack completion operation.

Conventionally, a post gravel pack completion logging operation utilizing a pulsed neutron logging tool may be performed by first pulling or tripping the wash pipe to the surface and then inserting a separate pulsed neutron logging tool. Specifically, during these operations the pulsed neutron logging tool is typically deployed on a separate wireline or tubing (e.g., via slick line, e-line, etc.) so that the logging tool may be progressed through the wellbore at a relatively slow logging speed (e.g., 1-2 ft/min). These slow speeds may be necessary in order to capture usable data, especially when engineered gravel is utilized in the gravel pack completion operation, and the surface equipment for deploying and retrieving wireline and the like may provide these relatively slow speeds. Conversely, the tripping or withdrawal speeds for larger tubing strings, such as, for example, a wash pipe, typically operate at much higher speeds (e.g., 15-20 ft./min.), thereby making wash pipe deployment unsuitable for conventional pulsed neutron logging operations. However, when additional tripping and insertion operations are utilized to separately deploy a logging tool within the wellbore following withdrawal of the wash pipe, significant time and costs are added to the overall gravel packing and subsequent logging operations such that the economic viability of such operations is reduced. Moreover, deployment of a pulsed neutron logging tool on a larger tubular, e.g., such as a wash pipe, has been traditionally been undesirable due to the relatively short battery life associated with such tools.

Accordingly, embodiments disclosed herein provide for logging tools (e.g., specifically pulsed neutron logging tools) that are coupled directly to the wash pipe (e.g., a distal end of the wash pipe) so that gravel pack logging operations may be conducted immediately following the insertion of the gravel pack within the annulus and simultaneously with tripping the wash pipe out of the completed wellbore. In addition, in some embodiments an activation or triggering method is disclosed for a pulsed neutron logging tool that allows for more efficient power management during operations. Further, data collection and processing methods are also disclosed that facilitate logging at the relatively faster speeds associated with tripping or withdrawal of the wash pipe from the wellbore following a gravel pack completion operation. As will be described in more detail below, the data collection and processing methods disclosed herein may also be useful for pulsed neutron logging operations whereby the logging tool is supported (e.g., suspended) with a tether (e.g., e-line, wireline, coiled tubing, conduit, cabling, etc.) instead of a washpipe (e.g., by increasing the logging speed of such operations). In addition, as will be described in more detail below, the data collection and processing methods disclosed herein may also be useful for performing a pulsed neutron logging operation regardless as to whether that pulsed neutron logging operation is conducted to assess a quality of a gravel pack as previously described above or for more general monitoring operations (e.g., such as more general reservoir surveillance).

Referring now to FIG. 1, a completion and logging system 10 is shown disposed within a wellbore 5 that extends within a subterranean formation 3. In this embodiment, wellbore 5 includes a first or cased section 5a extending from (or near) surface 2, and a second or uncase section 5b extending from cased section 5a to a distal or downhole end 6. Cased section 5a is lined with a casing or liner pipe 7 that is secured (e.g., via cement in some embodiments) to the inner wall 8 of the wellbore (which may more simply be referred to herein as wellbore wall 8). Uncased section 5b does not include a casing or liner pipe so that wellbore wall 8 is exposed.

System 10 generally includes a central or longitudinal axis 105, a screen assembly 12 and a wash pipe assembly 100. Screen assembly 12 includes a blank pipe 14 and a coupled (or integral) screen 16 extending axially from blank pipe 14 to a screen assembly shoe 18 (which is sometimes referred to as a washdown shoe). Screen 16 is a tubular member including a radially inner surface 16a, a radially outer surface 16b, and a plurality of perforations 17 extending radially (or substantially radially) between surfaces 16a, 16b.

Referring still to FIG. 1, wash pipe assembly 100 includes a wash pipe 102 and a logging tool 150 coupled to wash pipe 102. Wash pipe 102, generally speaking, is a tubular string, which may comprise a plurality of axially oriented tubular members that are coupled (e.g., threaded) end-to-end and suspended from surface 2. Wash pipe 102 includes a first or uphole end (not shown) disposed at (or near) surface 2 and a second or downhole end 102b disposed within wellbore 5, specifically within uncased portion 5b. While not specifically shown, wash pipe 102 includes one or more inner flow paths (e.g., such as an inner throughbore) that extend between the uphole end (not shown) and downhole end 102b.

Logging tool 150 is coupled to and extends from the lower end 102b of wash pipe 102. In this embodiment, logging tool 150 is a pulsed neutron logging tool, and thus, tool 150 is configured to emit neutrons into wellbore 5 and formation 3 and detect the resulting gamma ray response as previously described above. Additionally, control logic either disposed onboard logging tool 150 or at the surface 2 applies interpretive processing in order to generate a well log based on the measured gamma ray response. Further details of logging tool 150 and the data collection and processing methods utilized by logging tool 150 or associated equipment (e.g., surface equipment) are discussed in more detail below.

Figure 2:
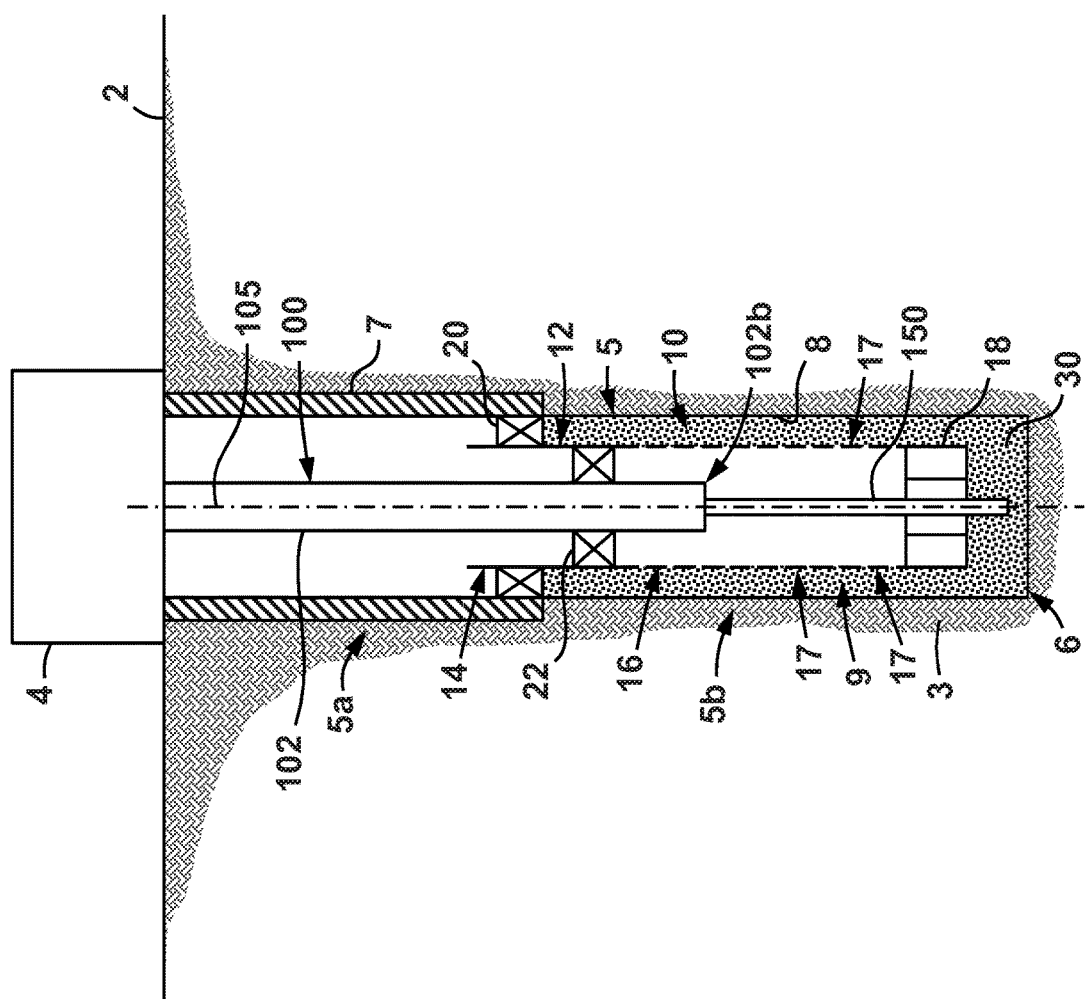
FIGS. 2 and 3 are sequential schematic views of a gravel pack completion and subsequent logging operation utilizing the completion and logging system of FIG. 1 according to some embodiments.

Referring now to FIG. 2, during a gravel pack completion operation, completion and logging system 10 is inserted within wellbore 5. Screen assembly 12 may be inserted either by wash pipe assembly 100 (e.g., by coupling screen assembly 12 to wash pipe 102 at surface 2 and lowering the coupled wash pipe 102 and screen assembly 12 downhole)

or screen assembly 12 may be installed within wellbore 5 prior to inserting wash pipe assembly 100 therein. In either case, screen assembly 12 is secured within wellbore 5, particularly within uncased section 5b and a packer or seal element 20 installed radially between blank pipe 14 and casing pipe 7. Thus, packer 20 prevents (or restricts) fluid flow radially between blank pipe 14 and casing pipe 7 during operations.

As shown in FIG. 2, with screen assembly 12 and packer 20 in place within wellbore 5, a slurry comprising gravel suspended within a liquid, is pumped or flowed downhole via the one or more flowpaths (e.g., a throughbore) extending within wash pipe 102 and is emitted from downhole end 102b into screen assembly 12. One or more seals 22 are disposed radially between wash pipe 102 and blank pipe 14 to prevent (or at least restrict) the flow of fluids (e.g., slurry) uphole between blank pipe 14 and wash pipe 102 during operations. As a result, upon entering screen assembly 12 from wash pipe 102, the slurry flows through the shoe 18, into uncased section 5b of wellbore 5, and fills the annular space or region 9 (or more simply annulus 9) extending radially between screen assembly 12 and wellbore wall 8. The liquid of the slurry is allowed to flow back into screen 16 via perforations 17 and ultimately is produced back to surface 2 (e.g., via wash pipe 102 or some other flow path); however, the gravel carried by the slurry is trapped within the annulus 9 thereby forming a gravel pack 30.

Figure 3:
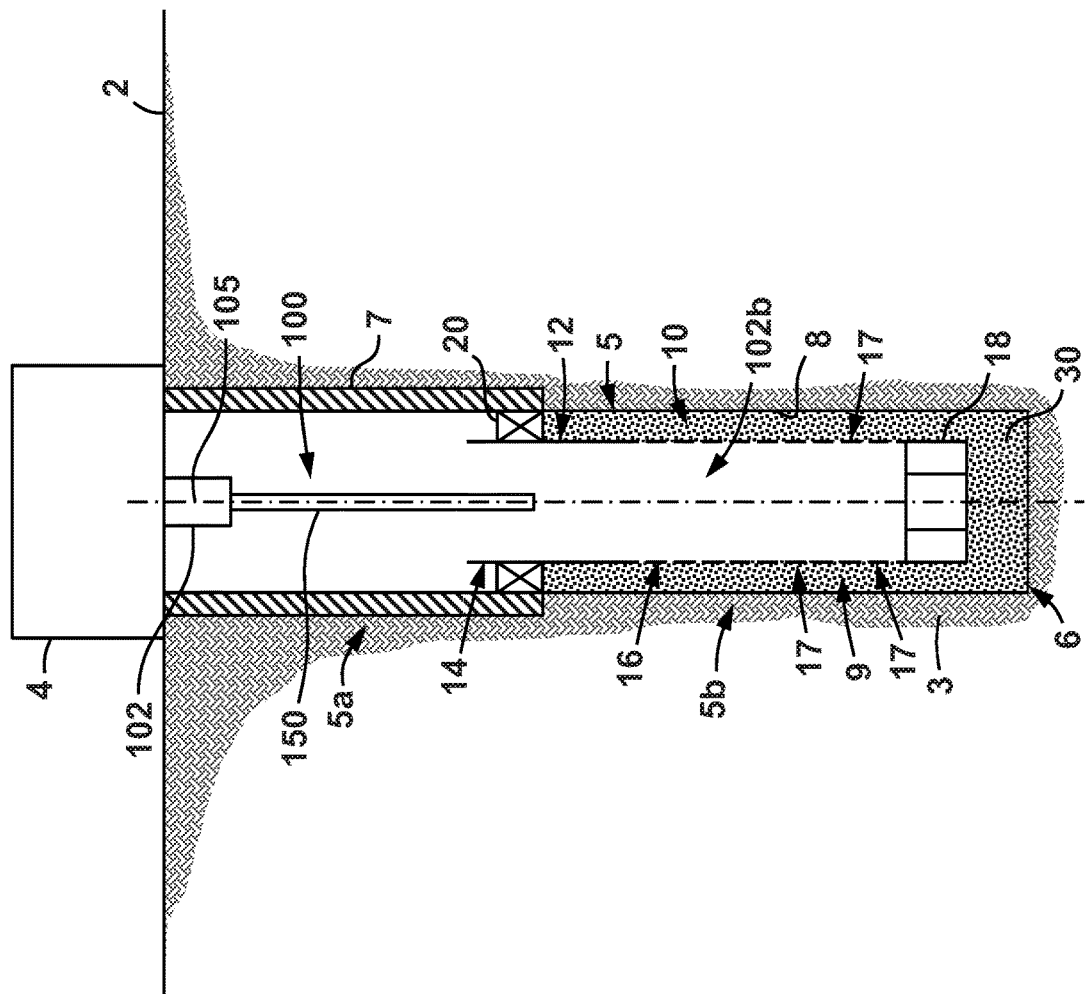

Referring now to FIG. 3, following the gravel pack completion operation described above, wash pipe 102 is withdrawn or tripped to surface 2 by surface equipment 4, thereby leaving screen assembly 12 and gravel pack 30 installed within wellbore 5. As previously described above, the gravel within gravel pack 30 is configured to filter out some or all of the fines that may be produced from formation 3 so that only (or substantially only) formation fluids (e.g., oil, gas, water, condensate, etc.) are produced through perforations 17 and ultimately to surface 2. Because the above-described gravel pack completion of FIGS. 1-3 is performed within an uncased section 5b of wellbore 5, so that annulus 9 extends radially between wellbore wall 8 and screen 16, this completion may be referred to as an open hole gravel pack completion as previously described above. To ensure that the gravel pack 30 sufficiently fills annulus 9 (and thus serves as an effective filter for the fines as previously described), a logging operation (e.g., a pulsed neutron logging operation) is carried out simultaneously with tripping or withdrawing wash pipe 102 to surface 2 as previously described above.

Specifically, during the logging operation logging tool 150 is activated (e.g., either manually or automatically as described in more detail below), and wash pipe 102 is withdrawn toward surface 2. Due in large part to the design and operation of the surface equipment 4 lifting and withdrawing wash pipe 102 to the surface, withdrawal or tripping speeds for wash pipe 102 and thus also logging tool 150 may be 5 ft/min or greater, such as, for example greater than or equal to 15 ft/min or 20 ft/min. Thus, as will be described in more detail below, logging tool 150 is configured to capture (and possibly also process) useful data during a logging operation while being withdrawn at these elevated speeds.

Figure 4:
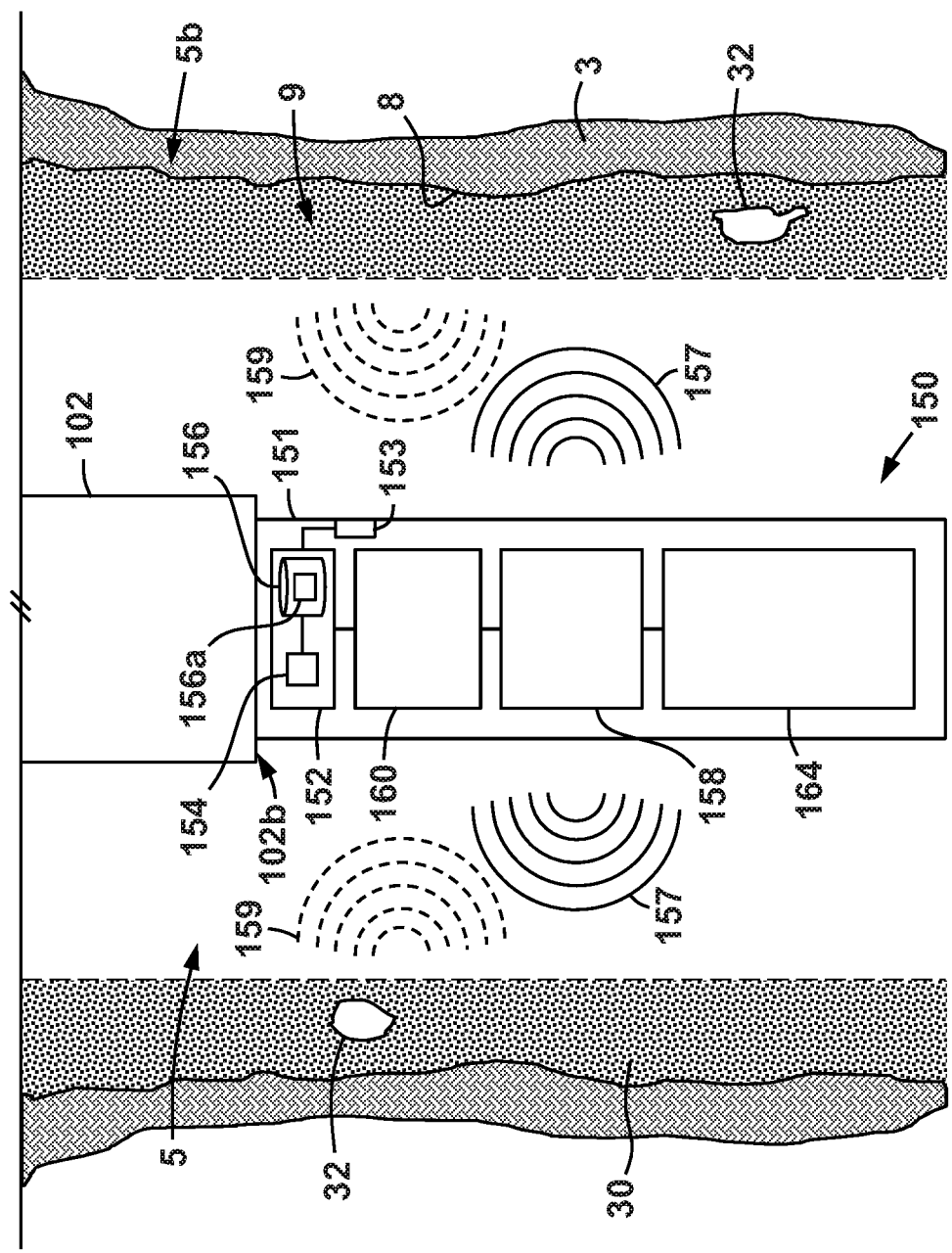
FIG. 4 is an enlarged schematic view of the logging tool of the completion and logging system of FIG. 1 according to some embodiments.

Referring now to FIG. 4, an embodiment of logging tool 150 is schematically shown. In this embodiment, logging tool 150 comprises a controller (or control unit) 152, a neutron emitter 158, a gamma ray detection assembly 160, and a power source 164 all coupled to one another within an outer housing assembly 151. Each of the controller 152, neutron emitter 158, gamma ray detection assembly 160, and power source 164 may be coupled to one another via a wired connection (e.g., electrical conductor, fiber optic cable, etc.), a wireless connection(s) (e.g., WIFI, BLUETOOTH®, near field communication, infrared, radio frequency communication, etc.), or some combination thereof.

Controller 152 may comprise any suitable device or assembly which is capable of receiving an electrical or mechanical signal and transmitting various signals to other devices (e.g., neutron emitter 158, gamma ray detection assembly 160, etc.). In particular, as shown in FIG. 2, in this example, controller 150 includes a processor 154 and a memory 156. Processor 154 (e.g., microprocessor, central processing unit, or collection of such processor devices, etc.) executes machine-readable instructions 156a (e.g., non-transitory machine-readable instructions) provided on memory 156, and upon executing the machine-readable instructions 156a on memory 156 provides the controller 152 with all of the functionality described herein. Memory 156 may comprise volatile storage (e.g., random access memory), non-volatile storage (e.g., flash storage, read only memory, etc.), or combinations of both volatile and non-volatile storage. Data consumed or produced by the machine-readable instructions 156a can also be stored on memory 156. For example, data captured by the gamma ray detection assembly 160 may be stored on memory 156.

Power source 164 may comprise any suitable component or components for storing electrical power. For example, power source 164 may comprise any suitable source of electrical power, such as, for example one or multiple batteries, capacitors, or combinations thereof. Power source 164 provides electrical power to each of the controller 152, neutron emitter 158, and gamma ray detection assembly 160. In addition, power source 164 may also provide electrical power to other components within logging tool 150 and/or completion and logging system 10 (see FIG. 1).

Neutron emitter 158 comprises a neutron source (not specifically shown) that is configured to selectively emit a pulse or burst of neutrons outward from tool 150 (e.g., into wellbore 5 and formation 3). In some embodiments, neutron emitter 158 may be configured to selectively emit a constant (or substantially constant) stream of neutrons from tool 150. Neutron emitter 158 may comprise any suitable and known device for emitting such a pulsed or constant stream of neutrons, such as, for example, a particle accelerator. While not specifically shown, it should be appreciated that neutron emitter 158 may also comprise appropriate radiation shielding in order to protect other components within tool 150 and/or system 10 from the emitted neutrons and/or to direct/focus the emitted neutrons in a desired direction.

Gamma Ray Detection Assembly 160 comprises one or more gamma ray detectors (not specifically shown) and is configured to output data indicative of any detected gamma rays to controller 152 (e.g., memory 156). Data indicative of the detected gamma rays may include, for example, the energy of the detected gamma rays (e.g., the gamma rays induced by the emitted neutrons), the number of detected gamma rays, the time (e.g., elapsed time) associated with gamma ray detection, the rate of gamma ray detection, the energy and number of natural gamma ray radiation (e.g., uranium, potassium, and/or thorium decay chains), etc. Gamma ray detection assembly 160 may record the above-described data within a pre-defined time window, a pre-defined energy window, or some combination thereof. Any suitable gamma ray detection method or device may be used within gamma ray detection assembly 160, such as, for example a scintillation crystal, a gamma ray counter, etc.

In general, during logging operations, controller 152 induces or instructs neutron emitter 158 to emit a pulse (or multiple pulses) or a stream of neutrons 157 outward from tool 150 into wellbore 5 and possibly formation 3. The emitted neutrons 157 interact with the materials in wellbore 5 and formation 3, and excite various materials, elements, atoms, etc. within the wellbore 5 and formation 3 to emit gamma rays 159 as previously described. The emitted gamma rays are then detected by the one or more gamma ray detectors (not specifically shown) disposed within the gamma ray detection assembly 160, and the gamma ray detection assembly 160 then outputs data (which may include information indicative of the detected gamma rays as previously described above) to controller 152 (e.g., memory 156). Controller 152 may perform processing of the data during or immediately after the logging operation or may simply store the data on memory 156 for later retrieval and processing by a separate computing device (e.g., a computing device at the surface 2 or a remote location).

Referring now to FIGS. 1 and 4, logging tool 150 may be either manually or automatically activated to initiate a logging operation during or prior to lifting wash pipe 102 to surface 2 (see FIGS. 1-3). Specifically, logging tool 150 may be in a standby or hibernation state during (and possibly prior to) the gravel pack completion operations, and is then subsequently activated (e.g., such as in a manner described herein) during or prior to the subsequent wash pipe 102 withdrawal or tripping operation. In some embodiments, logging tool 150 may be manually activated by a command generated at the surface 2 and communicated downhole to logging tool 150 (e.g., to controller 152 in some embodiments). The command may be communicated by any suitable wired connection (e.g., wired pipe, conductors extending from surface 2, etc.) or wireless connection (e.g., acoustic waves, radio frequency (RF) communication, infrared communication, etc.).

In some embodiments, logging tool 150 may be activated via a mechanical engagement or mechanism while logging tool 150 is disposed within wellbore 5. For instance, in some embodiments a profile or engagement feature(s) may be included along an inner surface within wellbore 5 (e.g., such as along an inner surface of casing 7, blank pipe 14, screen 16, etc.) that is configured to engage with the logging tool 150, or a surface coupled to logging tool 150. In some embodiments, logging tool 150 may additionally comprise a sleeve or other suitable member that is configured to engage with the profile or engagement feature(s) within wellbore 5 so as to physically actuate the sleeve. The physical actuation of the sleeve (or other component) of logging tool 150 may then activate the logging tool 150 (or an internal timer therein) to initiate a logging operation as previously described. In some embodiments, the engagement between the logging tool 150 (or some component thereof) and the profile or engagement feature(s) within wellbore 5 may occur when initially inserting the logging tool 150 within wellbore 5 and/or during withdrawal of the logging tool 150 from wellbore 5. In some embodiments, following a gravel pack completion operation as described above, the logging tool 5 may be lowered or raised within wellbore 5 so as to engage with the profile or engagement feature(s) and therefore initiate a logging operation as previously described.

In addition, in some embodiments, the pressure, temperature, and/or flow rate of fluid within wellbore 5 (e.g., surrounding logging tool 150 within screen assembly 12) may be controllably altered to trigger or activate logging tool 150. For example, in this embodiment, controller 152 (including processor 154 and memory 156) is coupled to a sensor array 153 coupled to housing assembly 151. Sensor array 153 may comprise one or a plurality of sensors that are configured to sense or measure various physical parameters, such as, for example, pressure, temperature, flow rate (e.g., the flow rate within wellbore 5 across tool 150), salinity (e.g., of the local wellbore fluid), magnetism (e.g., the strength and character of a local magnetic field around the tool 150), radiation, gravity, etc. In addition, in some embodiments, the sensor array 153 may also (or alternatively) include sensor(s) for measuring the movement of tool 150 within wellbore 5, such as accelerometers and/or inertial sensors.

In one example, the pressure within wellbore 5 (e.g., within screen assembly 12 and surrounding logging tool 150) may be increased or decreased to a predetermined value or pulsed to predetermined values in order to cause controller 152 to activate logging tool 150 (including specifically power source 164, neutron emitter 158, gamma ray detection assembly 160, etc.) and initiate a logging operation. The change in pressure may be measured or detected by one or more sensors within sensors array 153 and reported to controller 152. Controller 152 may then determine that a predetermined pattern or value of pressure has been detected and in response activate logging tool 150 so as to initiate a logging operation as described above. Machine-readable instructions 156a stored on memory 156 and executed by processor 156 may allow controller 152 to evaluate the detected pressure values or patterns and initiate a command to the other components of tool 150 (e.g., emitter 158, detection assembly 160, etc.) to initiate a logging operation as previously described. In addition, in other embodiments, similar activation of tool 150 may be achieved by similar, selective variations in other parameters within wellbore 5, such as, for example temperature, flow rate, etc.

In other embodiments, logging tool 150 may be automatically activated by an internal timer. For example, an internal timer may be set within logging tool 150 prior to insertion within wellbore 5 (and thus prior to the gravel pack completion operations described above). The time programmed into the timer on logging tool 150 may be sufficient to allow all gravel pack completion operations to cease prior to activating tool 150 to initiate logging procedures. In some embodiments, the logging tool 150 may comprise a mechanical switch mechanism for activating the logging tool 150 and therefore initiating a logging operation. In some of these embodiments, the mechanical switch may be actuated based on a timer as described above.

Referring still to FIGS. 1 and 4, in some embodiments, logging tool 150 may be activated by initiating the tripping operation for wash pipe 102 (see FIGS. 1-3). In particular, in these embodiments, sensor array 153 may include one or more accelerometers (and/or inertial sensors). Once wash pipe 102 and logging tool 150 begin to move toward the surface 2 above a threshold speed and/or continuously for a predetermined period of time (e.g., during withdrawal of the wash pipe 102 from wellbore 5—see FIG. 3), the accelerometer(s) (and/or inertial sensor(s)) within array 153 register the movement and/or acceleration. In response, controller 152 may determine (based on machine-readable instructions executed by processor 154) that wash pipe 102 is being withdrawn (or tripped) to the surface 2 and in response activates the components of logging tool 150 (e.g., emitter 158, detection assembly 160) to initiate a logging operation as previously described above. In some embodiments, controller 152 may activate the components of logging tool 150 in response sensing a predetermined pattern, combination, or sequence of movements and/or accelerations via sensor array 153.

In some other embodiments, logging tool 150 may be activated by selectively placing tool 150 near or proximate a source of radiation or magnetism (or other suitable energy or force). In particular, in these embodiments, a sensor suitable for sensing either or both of radiation or magnetism (e.g., including the strength and/or character of a local magnetic field) may be included within sensor array 153. During operations, following a gravel pack completion as described above (see FIGS. 1-3) tool 150 may be shifted (e.g., axially, rotationally) within wellbore 5 (e.g., by making a corresponding movement of wash pipe 102) so as to bring the radiation and/or magnetic sensor proximate to a source of radiation or a magnetic field that is disposed within wellbore 5 (e.g., within screen assembly 12, casing pipe 7, etc.). Once the sensor senses the appropriate energy or force (e.g., radiation, magnetism) or a predetermined pattern of such energy or force, controller 152 may (e.g., via execution of machine-readable instructions by processor 154 as previously described) activate the components of logging tool 150 (e.g., emitter 158, detection assembly 160) to initiate a logging operation as previously described above. In some embodiments, the controller 152 may be configured to activate logging tool 150 upon sensing a predetermined number of axially spaced magnetic and/or radioactive tags within the wellbore 5, such as would be indicative of lowering or tripping wash pipe 102 to the surface 2.

In some embodiments, logging tool 150 may additionally include machine-readable instructions (e.g., machine-readable instructions 156a stored on memory 156 and executed by processor 154) that are configured to prevent logging tool 150 from activating and initiating a logging operation when logging tool 150 is not disposed within wellbore 5. For example, the machine-readable instructions may prevent logging tool 150 from initiating a logging operation while the logging tool 150 is disposed at or near the surface 2. Such machine-readable instructions are desirable so as to avoid potentially exposing personnel or equipment at the surface 2 to radiation (e.g., pulses of neutrons 157).

In one embodiment, controller 152 may prevent the activation of tool 150 and thus the initiation of a logging operation until a predetermined condition threshold is met. In some of these embodiments, controller 152 may prevent the actuation of only some of the components of logging tool 150 (e.g., power source 164, neutron emitter 158, etc.) until the predetermined condition threshold is met. The predetermined condition threshold may include a minimum temperature, pressure, flow rate, salinity, or some combination thereof is sensed or detected by controller 152 (e.g., via sensor array 153). In some embodiments, the predetermined condition threshold may include one or more conditions that are expected within the wellbore 5, such as within the uncased section 5b of wellbore. The predetermined condition threshold may be selected such that accidental achievement of the select condition(s) is improbable (or impossible) at the surface 2.

In addition, following the completion of a logging operation, tool 150 may be either manually or automatically deactivated in a similar manner to that described above for the manual or automatic activation at the initiation of a logging operation. For example, in some embodiments, as the logging tool 150 progresses toward the surface 2, the previously described predetermined condition threshold may no longer be met so that controller 152 may deactivate tool and cease logging operations. In other embodiments, a command may be sent (e.g., via wired or wireless connection as previously described above) to deactivate tool 150 at a desired point or position within wellbore 5. In still other embodiments, a timer may be set by controller 152 at the initiation of logging operations, and once the allotted time for the logging operation is achieved, controller 152 may deactivate tool 150.

Referring still to FIGS. 1 and 4, as previously described, the gamma ray response detected by logging tool 150 (e.g., gamma rays 159) may be utilized to determine a number of attributes and characteristics about both wellbore 5 (including gravel pack 30) as well as formation 3. In some embodiments, various processing operations are carried out for the data received by tool 150 during the logging operation (e.g., detected gamma rays 159). Some of these processing operations will now be discussed below. It should be appreciated that data processing may be performed by logging tool 150 (e.g., by controller 152) by components or equipment disposed at surface 2 (e.g., either proximate surface equipment 4 or at a remote location from surface equipment), or a combination thereof.

For example, in some embodiments, the time decay spectrum and energy spectrum of the gamma ray response detected by logging tool 150 (e.g., by gamma ray detection assembly 160) may be analyzed to determine the petrophysical parameters, such as borehole neutron capture cross-section, formation neutron capture cross-section, carbon-oxygen ratio, etc., both within wellbore 5 and formation 3. Specifically, because neutron emitter 158 may emit pulses of neutrons 157 into wellbore 5 and formation 3 as previously described, the detected neutron induced gamma ray response 159 may also somewhat ebb and flow over time. By analyzing the slope or rate of the decay in detected gamma rays (in addition to other analysis such as spectroscopy), factors, such as the oil, gas, and/or water saturation of the formation 3 (and possible wellbore 5), are ascertainable.

In addition, in some embodiments, analysis of the detected gamma rays 159 may also show the activation of various elements, which can give an indication of the composition of wellbore 5 and/or formation 3. For example, the gamma ray response 159 may have different energy characteristics (e.g., energy levels or amounts) depending on the elements (particularly the nuclei as previously described) that are impacted by the emitted neutrons 157. Thus, by performing a spectroscopy analysis on the detected gamma rays (e.g., the gamma rays detected by gamma ray detection assembly 160) it may be possible to ascertain the composition of wellbore 5 and formation 3. The composition makeup of wellbore 5 and formation 3 may allow personnel to draw various useful conclusions. For example, such spectroscopy analysis may provide the levels of oxygen, silicon, or aluminum activation within formation 3 or wellbore 5. High activation levels for one or more of these elements may indicate an increased concentration of the element in question within the measurement zone (which may include formation 3 and wellbore 5). For instance, high activation of oxygen may indicate voids within either gravel pack 30 or formation. Conversely, high activation of silicon may be indicative of a high density for gravel pack 30 within a particular area (since gravel may comprise silicon). Finally, some engineered gravel materials may include naturally radioactive tracer elements (e.g., uranium, thorium, potassium, etc.). When such as gravel is used, logging tool 150 may work in a passive mode whereby gamma rays of the naturally radioactive tracer elements can be detected by logging tool 150. Analysis of the detected gamma rays can then yield an estimate on the concentration of the naturally radioactive materials disposed within the gravel, which provides an indication of the gravel pack quality (e.g., density). In other embodiments, gravel materials may include an additive tracer element that has a high neutron capture cross-section, such as, for example, gadolinium, boron, etc. In these circumstances, neutrons emitted from neutron emitter 158 interact with the tracer elements, which emit characteristic gamma rays in response. Spectroscopy analysis can then be performed on the detected gamma rays to determine a concentration of the tracer element. If the concentration of the tracer element is determined to be relatively high, this may provide an indication of a good quality gravel pack 30.

Additional attributes of the formation 3 and/or wellbore 5 may also be determined or indicated by the gamma rays detected by logging tool 150 (e.g., by gamma ray detection assembly 160) during a logging operation. Such attributes may include, for example, formation sigma, wellbore sigma, flow rate, scale detection, etc.

Figure 5:
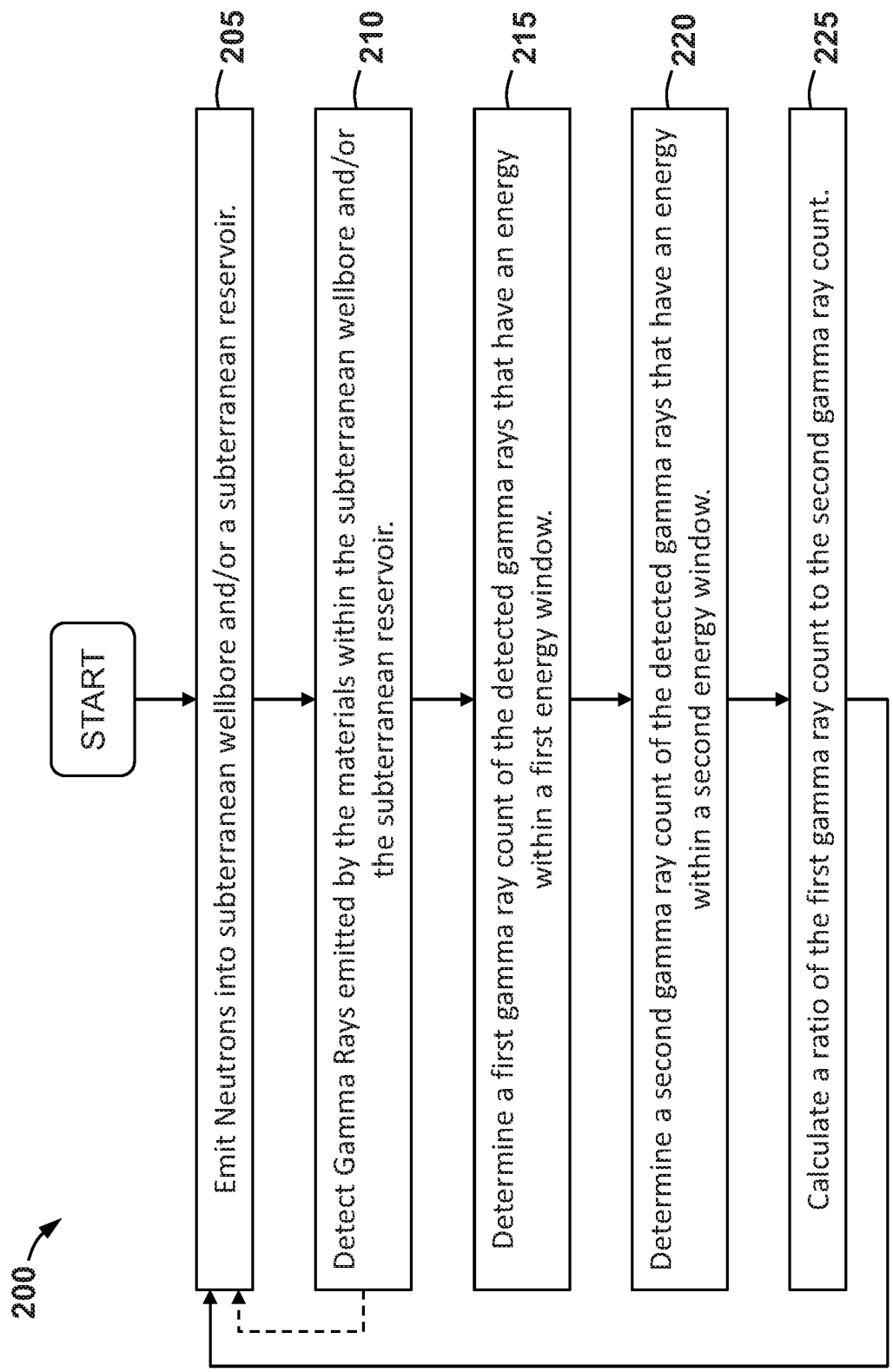
FIG. 5 is a diagram of a method for performing a logging operations within a subterranean wellbore according to some embodiments.

Referring now to FIGS. 4 and 5, as previously described above, logging operations with logging tool 150 may be used to conduct general subterranean reservoir surveillance, or to evaluate the quality of a gravel pack within annulus 9 of wellbore 5. During the above-described logging operations, logging tool 150 is withdrawn or tripped to the surface 2 along with wash pipe 102 at relatively high speeds (e.g., 5-20 ft/min or more in some embodiments). As previously described above, a pulsed neutron logging operation may call for a relatively slow ascent or logging speed (e.g., 1-2 ft/min) to obtain usable data (e.g., such as when analyzing the gravel pack for tracer elements have a high neutron capture cross-section as previously described). Thus, a data collection and processing method according to some embodiments is utilized either by logging tool 150 and/or by equipment or components disposed at the surface 2 to ensure that useful data is collected by logging tool 150 during the relatively rapid ascent within wellbore 5.

In particular, FIG. 5 depicts an embodiment of a method 200 of collecting and processing data during a wellbore logging operation (e.g., such as the wellbore logging operation shown in FIGS. 1-3 and described above). Method 200 is described below with reference to completion and logging system 10 (particularly logging tool 150). However, it should be appreciated that method 200 may also be performed with other systems, and references to completion and logging system 10 are merely intended to enhance the clarity of method 200. In addition, method 200 may also be performed for pulsed neutron logging operations that do not generally involve the evaluation of a gravel pack (e.g., such as gravel pack 30). Thus, reference to completion and logging system 10 and/or gravel pack 30 should not be interpreted as limiting the application of method 200 in general. In at least some embodiments, parts of method 200 may be carried out by onboard controller 152 (see e.g., FIG. 4), and/or by one or more separate controllers or computing devices (e.g., such as a controller or computing device disposed at the surface 2 in FIG. 1). Therefore, controller 152 (and/or the one ore more separate controllers or computing devices) may comprise machine-readable instructions for carrying out some or all of method 200 (e.g., such as machine-readable instructions 156a stored in memory 156 described above).

Initially, method 200 includes emitting neutrons into a subterranean wellbore and/or subterranean reservoir at 205. For instance, in some embodiments, method 200 may include emitting neutrons into an annulus (e.g., annulus 9) that is at least partially filled with gravel pack (e.g., gravel pack 30) at 205. In addition, in some embodiments, block 205 may comprise emitting neutrons into other portions or sections of the subterranean wellbore (e.g., wellbore 5) that do not include a gravel pack (e.g., gravel pack 30) and/or emitting neutrons into the subterranean reservoir (e.g., reservoir 3) surrounding the wellbore. The emission of neutrons may be accomplished with a suitable neutron emitter such as, for example neutron emitter 158 within logging tool 150 previously described above. Next, method 200 includes detecting gamma rays emitted by the surrounding materials within the subterranean wellbore and/or the subterranean reservoir at 210. The detected gamma rays may comprise neutron induced gammas rays or naturally occurring gamma rays. For instance, in some embodiments, the detected gamma rays may be emitted by materials disposed within a gravel pack (e.g., gravel pack 30) disposed within the wellbore. In some embodiments, the detected gamma rays may be emitted by materials disposed within portions of the wellbore that do not include a gravel pack and/or from the materials within the subterranean reservoir surrounding the wellbore. The gamma rays detected at 210 may be those that are produced by the corresponding materials as a result of interaction with the emitted neutrons from 205. Specifically, neutrons emitted at 205 may be absorbed within the nuclei of atoms within the corresponding, and in response, the nuclei of those atoms may emit energy in the form of the gamma rays as previously described. The emitted gamma rays are then detected by a suitable detector (e.g., gamma ray detection assembly 160) at 210.

Next, method 200 includes determining a first gamma ray count from the gamma rays detected at 210 that have energies within a first energy window at 215. In addition, method 200 includes determining a second gamma ray count from the gamma rays detected at 210 that have energies within a second energy window at 220. In some embodiments, the first energy window may include a lower range of energy than the second energy window.

Specifically, with reference to completion and logging system 10, the gravel disposed within gravel pack 30 may include (or be doped with) one or more particular elements. In some embodiments, the gravel pack 30 may be doped with a non-radioactive element, such as, for example gadolinium (Gd) as previously described above. For example, in some embodiments, the gravel pack 30 may be doped with a Gd oxide such as discussed in U.S. Pub. No. 2009/0210161 which is incorporated herein by reference. The gamma ray energy spectrum for Gd contains higher typical responses in a lower range of energies. Thus, in embodiments that utilize a Gd oxide doped gravel pack (e.g., gravel pack 30), a first energy window may be an energy range that would be characteristic for a gamma ray response from most of the Gd atoms that are disposed within gravel pack 30. The second energy window may thus be an energy range that is above the first energy window so that it represents a range of energy levels/amounts that would not be characteristic of the gamma ray response from most of the Gd atoms within gravel pack 30. Still more specifically, in some particular embodiments, the first energy window may include energies ranging from 0.5 MeV to 3.0 MeV, such as from 0.6 MeV to 1.7 MeV. In addition, in these particular embodiments, the second energy window may include energies ranging from 3.0 MeV to 9.0 MeV, such as from 4 MeV to 8.2 MeV.

Referring still to FIGS. 4 and 5, method 200 includes calculating a ratio of the first gamma ray count from 215 to the second gamma ray count from 220 at 225. As previously described, the first energy window may be characteristic of the gamma ray response for a majority of the atoms of a particular element (e.g., such as Gd) that may be present within gravel pack 30, and the second energy window may not be characteristic of the gamma ray response for a majority of the atoms of the particular element within gravel pack 30. Thus, without being limited to this or any other theory, the calculated ratio of the gamma ray counts from the first energy window and the second energy window may provide an indication of concentration of the element in question (again which may be Gd in some embodiments) within the gravel pack 30. Thus, if the ratio calculated at 225 is above a value which would be expected or known for a region of the wellbore 5 where there is no gravel pack (e.g., gravel pack 30), it may provide an indication that gravel pack 30 (e.g., which is doped with Gd, Boron, or other elements with high neutron capture cross-section as previously described) is present at the depth of the current measurement set. If, on the other hand, the ratio calculated at 225 is close to or below the value that would be known or expected for a region of wellbore 5 where there is no gravel pack, it may provide an indication that there is no or little gravel within the annulus at the depth of the current measurement set. If little or no gravel is detected at a given depth via the analysis above, it may indicate that there are voids 32 within gravel pack 30 that are not filled with gravel (at least at the given depth). These voids 32 can reduce the filtering functionality of gravel pack 30 as previously described above. In the above-described analysis, the expected or known value for the ratio calculated at 225 that corresponds to a region of the wellbore 5 where no gravel is present may be obtained through a calibration process. For example, a logging operation (including the analysis above) may be carried out within a region of the wellbore 5 where it is known that no gravel (e.g., gravel pack 30) exists. The resulting ratio (e.g., the ratio calculated at 225) from this calibration process may provide the known or expected value previously described above for later comparison with subsequently calculated ratios.

Thus, in some embodiments, following calculating the ratio at 225, method 200 may additionally include determining whether the calculated ratio is greater than a predetermined value. The predetermined value may comprise the expected or known value for the ratio calculated at 225 that corresponds to a region of the wellbore 5 where there is no gravel. If the ratio calculated at 225 is greater than the predetermined value, it may be determined that there are no voids within the gravel pack. However, if the ratio calculated at 225 is less then or equal to the predetermined value, it may be determined that there are voids within the gravel pack (or there is no gravel pack at the logged location at all).

Blocks 215, 220, 225 may also be useful for evaluating other portions of a subterranean wellbore (e.g., such as those that do not include a gravel pack) and/or the surrounding subterranean reservoir (e.g., reservoir 3). Specifically, the first energy window and second energy window of blocks 215 and 220, respectively, may be chosen to correspond with a particular element or material of interest within the wellbore and/or reservoir. Thus, by calculating a ratio of the corresponding gamma ray counts within the appropriately selected first and second energy windows, a determination may be made as to the presence and/or concentration of the particular material of interest within the wellbore and/or reservoir in a substantially similar manner to that described above with respect to gravel pack 30. Thus, method 200 may be employed to evaluate other portions of a subterranean wellbore (e.g., such as those that do not include a gravel pack) and/or the surrounding subterranean reservoir (e.g., reservoir 3) in some embodiments.

Following calculating the ratio at 225 (or the additional determinations described above with respect to the presence of voids within the gravel pack), method 200 cycles back to repeat blocks 205-225. For embodiments where method 200 is practiced during a logging operation (e.g., with logging tool 150) method 200 may be continuously repeated. For example, in some embodiments, method 200 may be repeated over designated time period (e.g., every 5, 10, 15, 20, 25, 30 seconds, every 5, 10, 15, 20, minutes, etc.). In other embodiments, method 200 may be repeated based on a physical location of the logging tool 150. For example, as logging tool 150 is traversed through wellbore 5 (e.g., along axis 105), method 200 may be repeated every 5, 10, 15, 20, etc. feet of axial movement. Still further, in some embodiments, blocks 205, 210 may be repeated (as shown by the dotted arrow in FIG. 5) during the logging operation, so as to produce a data set of the entire wellbore 5 (or at least the area of interest within the wellbore and/or the reservoir). In these embodiments, blocks 215-225 may be carried out after the logging operation has been completed. Alternatively, blocks 215-225 may be carried out simultaneously with the repeated succession of blocks 205, 210 (e.g., by logging tool 150) so that gamma rays detected during previous performances of block 210 may be analyzed while gamma rays are still being detected as subsequent performances of block 210.

When method 200 is applied to a wellbore logging operation such as described above, the logging tool (e.g., logging tool 150) may be traversed relatively quickly through the wellbore (e.g., wellbore 5) while still achieving useful data. In particular, by calculating the ratio of predetermined energy windows based on the known make up of the gravel pack material, useful information or conclusions regarding the quality of the gravel pack, and/or the presence of a particular material(s) within the wellbore and/or reservoir may be achieved with a high logging speed (e.g., such as a logging speed which would typically be associated with a tripping operation for a wash pipe). This represents an improvement over conventional pulsed neutron logging operations, which may utilize spectroscopy-based analysis schemes that typically require relatively slow logging speeds (e.g., 1-3 ft/min) in order to produce useful information or conclusions (i.e., that includes relatively little noise). Accordingly, in some embodiments through use of the data collection and processing method 200 described above, logging operations by a logging tool coupled to the end of a wash pipe (e.g., such as logging tool 150 coupled to wash pipe 102) may be simultaneously performed while tripping the wash pipe 102 to the surface 2 following a gravel pack completion operation. Thus, the amount of time (e.g., rig time, logging time, etc.) required for performing a combined gravel pack completion and subsequent pulsed neutron logging operation is substantially reduced, thereby improving the economic requirements for such operations.

While some embodiments of the above-described completion and logging system 10 are utilized within an open hole gravel pack completion (see FIGS. 1-3), it should be appreciated that completion and logging system 10 may also be utilized within other types of gravel pack completions, such as, for example a case hole gravel pack completion. For instance, reference is now made to FIG. 6 which shows completion and logging system 10 being utilized to perform a so-called cased hole gavel pack completion within a wellbore 305 extending within subterranean formation 3.

Figure 6:
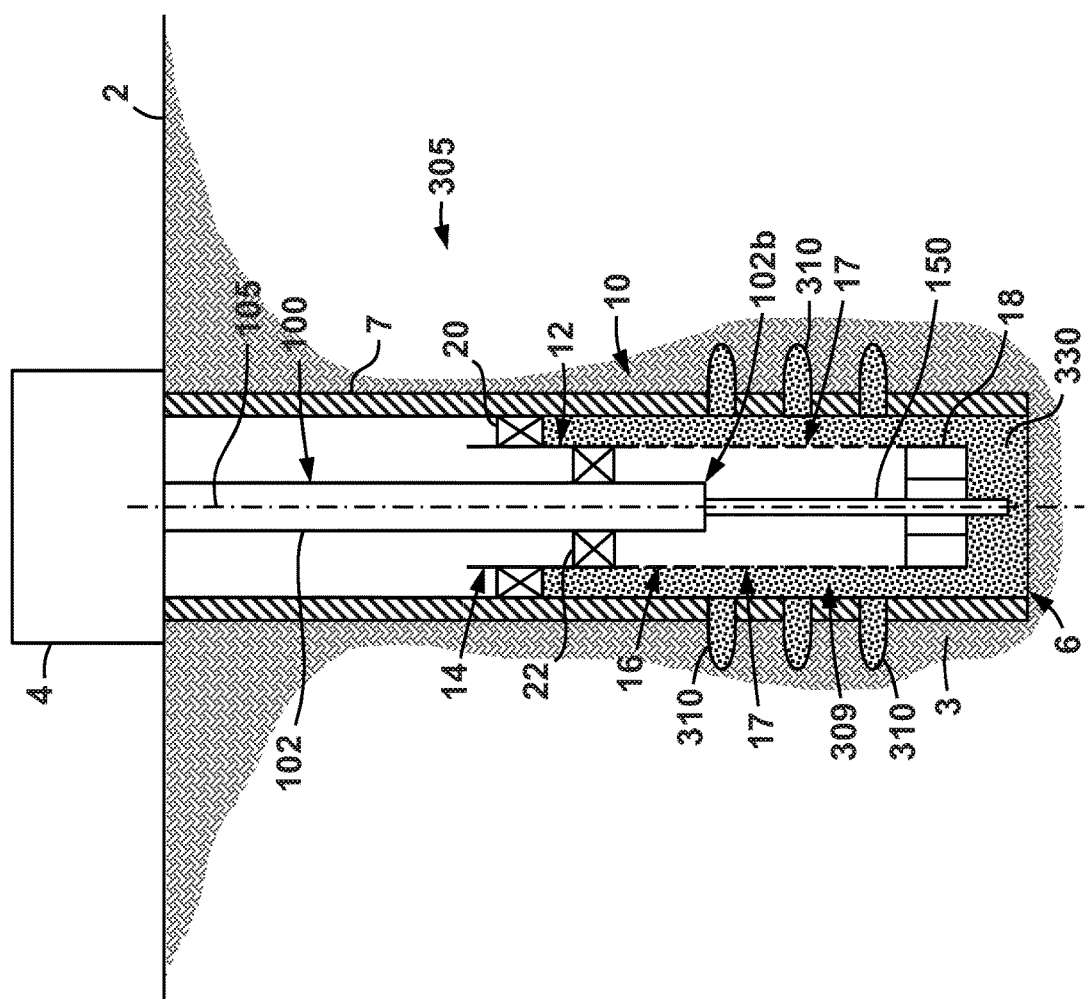
FIG. 6 is a schematic view of a completion and logging system for a subterranean wellbore according to some embodiments.

Many of the features shown in FIG. 6 are the same as those depicted in FIGS. 1-3, and thus, like reference numerals will be used to indicate like components and the description below will focus on the features shown in FIG. 6 that are different from those shown in FIGS. 1-3. In particular, in this embodiment, a gravel pack is inserted within an annulus 309 within wellbore 305 that is defined radially between casing or liner pipe 7 and screen 16 (rather than an annulus formed radially between screen 16 and wellbore wall 8 as previously described). In this embodiment, the casing pipe 7 may include a plurality of perforations 310 that provide communication between annulus 309 and formation 3. The gravel pack completion operations for annulus 309 of wellbore 305 are substantially the same as those described above for annulus 9 shown in FIGS. 1-3. In particular a gravel-containing slurry is emitted from lower end 102b of wash pipe 102, flowed through shoe 18 and then into annulus 309. The liquid of the slurry is allowed to flow back into screen 16 via perforation 17 and thereafter back to surface 2, while the gravel is trapped within annulus 309, thereby forming gravel pack 330 therein. Thereafter wash pipe 102 may be withdrawn or tripped to the surface 2, and a logging operation may be performed by logging tool 150 in the same manner as described above. Accordingly, the details of the subsequent logging and tripping operation are not repeated herein in the interest of brevity.

In addition, it should be appreciated that the above-described data collection and processing methods (e.g., method 200) may be utilized within pulsed neutron logging operations that do not involve the use of wash pipe (e.g., wash pipe 102). For instance, referring now to FIG. 7, a logging system 400 for performing a pulsed neutron logging operation within wellbore 5 extending within subterranean formation 3 is shown. As previously described, wellbore 5 includes an open hole gravel pack completion; however, it should be appreciated that logging system 400 may be utilized to conduct a logging operation in any suitable completed or uncompleted wellbore (e.g., such as a cased hole gravel pack as shown in FIG. 6, an uncompleted borehole, a non-gravel packed completion, etc.).

Generally speaking, logging system 400 includes logging tool 150, previously described above (see e.g., FIG. 4); however, logging tool 150 is coupled to an elongate tether 402 instead of washpipe 102 (see e.g., FIG. 1). In particular, in FIG. 7, logging tool 150 is shown disposed on a lower end 402b of tether 402; however, logging tool 150 may be disposed at any length or position along tether 402. Also, in other embodiments, tool 150 may be coupled to other components that are coupled to tether 402. In this embodiment, tether 402 comprises wireline (e.g., e-line, slick line, etc.), but any suitable line or tether may be used in other embodiments. For instance, in some embodiments tether 402 may comprise, for example, coiled tubing, cabling, conduit, pipe string, etc. In some embodiments, tether 402 may include one or more conductors (e.g., conductive wires, fiber optic cables, etc.) that are configured to transmit control and/or power signals (e.g., electrical power) between the surface 2 and logging tool 150 during operations. Thus, in some of these embodiments, logging tool 150 may not include on-board power source 164 (see e.g., FIG. 4).

During operations, logging tool 150 may employ the same data collection and processing methods described above (e.g., method 200) so as to perform a pulsed neutron logging operation within wellbore 5. As a result, logging tool 150 may be traversed through wellbore 5 at a relatively rapid rate or speed during a logging operation (e.g., greater than or equal to 5 ft/min, 15 ft/min, 20 ft/min, etc. as previously described above). Accordingly, in these embodiments, the time required to perform a pulsed neutron logging operation may be reduced, thereby improving the economic impact of such an operation. During these operations, the data and processing methods may be wholly or partially performed by an onboard controller (e.g. controller 152 in FIG. 4) or a separate controller or computing device (e.g., such as a controller or computing device disposed at the surface 2 in FIG. 1).

Further, it should be appreciated that the above-described data collection and processing methods (e.g., method 200) may be utilized within pulsed neutron logging operations that are not necessarily aimed at assessing a quality of a gravel pack completion. For instance, in some embodiments, the above-described data collection and processing methods may be utilized to conduct general reservoir surveillance. In some operations, a pulsed neutron logging tool (e.g., such as logging tool 150) may be coupled to a suitable conveyance member (e.g., such as tether 402 previously described above) and traversed within a subterranean wellbore in order to conduct a pulsed neutron logging operation which may be intended to monitor or assess a number of conditions, qualities, parameters, components, etc. of the wellbore and/or the surrounding subterranean formation.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of completing a subterranean wellbore, the method comprising:
   (a) flowing a proppant into an annulus defined within the wellbore with a wash pipe to form a gravel pack within the annulus;
   (b) withdrawing the wash pipe from the wellbore after (a) at a speed of 15 ft/min or greater; and
   (c) performing a pulsed neutron logging operation for the gravel pack during (b) with a pulsed neutron logging tool coupled to the wash pipe by:
      (c1) emitting neutrons into the gravel pack that are absorbed into atoms disposed within the gravel pack;
      (c2) detecting gamma rays that are emitted from the atoms in response to the neutrons being absorbed therein;
      (c3) determining a first gamma ray count within a first energy window of the gamma rays detected at (c2), and a second gamma ray count within a second energy window of the gamma rays detected at (c2), wherein the second energy window is higher than the first energy window, wherein the first energy window is characteristic of a gamma ray response from a non-radioactive element positioned within the gravel pack, wherein the second energy window is not characteristic of the gamma ray response from the non-radioactive element, and wherein the non-radioactive element comprises gadolinium (Gd); and
      (c4) calculating a ratio of the first gamma ray count to the second gamma ray count.

2. The method of claim 1, comprising withdrawing the wash pipe and the pulsed neutron logging tool from the wellbore during (b) and (c) at about 15-20 feet/minute.

3. The method of claim 1, comprising:
   (d) wirelessly transmitting a command within the wellbore; and
   (e) activating the pulsed neutron logging tool with the command.

4. The method of claim 1, comprising:
   (f) sensing a change in a wellbore condition; and
   (g) activating the pulsed neutron logging tool as a result of the sensing in (f).

5. The method of claim 4, wherein the wellbore condition comprises pressure or temperature.

6. The method of claim 4, wherein (f) comprises sensing the change in the wellbore condition with a sensor coupled to the pulsed neutron logging tool.

7. The method of claim 1, comprising:
   (h) sensing a movement of the pulsed neutron tool; and
   (i) activating the pulsed neutron logging tool as a result of the sensing in (h).

* * * * *